(12) United States Patent
Liu et al.

(10) Patent No.: US 7,708,469 B2
(45) Date of Patent: May 4, 2010

(54) FIBER OPTIC CONNECTOR ASSEMBLY AND METHOD FOR VENTING GAS INSIDE A FIBER OPTIC CONNECTOR SUB-ASSEMBLY

(75) Inventors: Xin Liu, Hickory, NC (US); Darrin M. Miller, Conover, NC (US); Joel C. Rosson, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/082,558

(22) Filed: Apr. 11, 2008

(65) Prior Publication Data
US 2009/0257717 A1    Oct. 15, 2009

(51) Int. Cl.
*G02B 6/38* (2006.01)
(52) U.S. Cl. .......................................... 385/66; 385/55
(58) Field of Classification Search ................... 385/66, 385/55
See application file for complete search history.

(56) References Cited

U.S. PATENT DOCUMENTS

| | | | | |
|---|---|---|---|---|
| 4,307,369 A * | 12/1981 | Jackson, Jr. | .................. | 337/282 |
| 4,313,100 A * | 1/1982 | Schmunk | ..................... | 337/168 |
| 4,414,527 A * | 11/1983 | Biller | .......................... | 337/180 |
| 4,753,510 A * | 6/1988 | Sezerman | ..................... | 385/61 |
| 4,826,277 A | 5/1989 | Weber et al. | ............. | 350/96.23 |
| 4,889,406 A * | 12/1989 | Sezerman | ..................... | 385/35 |
| 5,016,970 A * | 5/1991 | Nagase et al. | .................. | 385/60 |
| 5,096,276 A | 3/1992 | Gerace et al. | .................. | 385/76 |
| 5,181,267 A | 1/1993 | Gerace et al. | .................. | 385/86 |
| 5,216,733 A * | 6/1993 | Nagase et al. | .................. | 385/60 |
| 5,436,994 A | 7/1995 | Ott et al. | ......................... | 385/86 |
| 5,748,819 A * | 5/1998 | Szentesi et al. | ............... | 385/60 |
| 5,774,613 A | 6/1998 | Tanabe et al. | .................. | 385/84 |
| 6,000,858 A * | 12/1999 | Bloom | ......................... | 385/94 |
| 6,283,644 B1 * | 9/2001 | Gilliland et al. | ............... | 385/93 |
| 6,340,247 B1 * | 1/2002 | Sakurai et al. | ................. | 385/78 |
| 6,419,402 B1 | 7/2002 | Zimmel | ........................ | 385/86 |

(Continued)

FOREIGN PATENT DOCUMENTS

JP          58-172610          10/1983

(Continued)

OTHER PUBLICATIONS

Patent Cooperation Treaty, Invitation to Pay Additional Fees for International Application No. PCT/US09/002156, Jul. 9, 2009, 1 page.

*Primary Examiner*—K. Cyrus Kianni
(74) *Attorney, Agent, or Firm*—Michael E. Carroll, Jr.

(57) ABSTRACT

A fiber optic connector assembly and method for venting gas inside in a fiber optic connector sub-assembly. The fiber optic connector assembly includes a connector sub-assembly including a ferrule and a ferrule holder having a passage extending therethrough. A stiffener tube having a tube body disposed about a portion of at least one optical fiber supports insertion of the optical fiber into the ferrule holder passage. The stiffener tube contains at least one opening in its tube body configured to vent gas trapped inside the stiffener tube during assembly. In this manner, the trapped gas does not form a gas pocket in the bonding agent, which could compromise bonding among the optical fiber, stiffener tube, and connector sub-assembly.

9 Claims, 8 Drawing Sheets

U.S. PATENT DOCUMENTS

| | | | |
|---|---|---|---|
| 6,419,810 B1 * | 7/2002 | Tanaka et al. | 205/73 |
| 6,536,956 B2 * | 3/2003 | Luther et al. | 385/86 |
| 6,550,979 B1 | 4/2003 | Fleenor et al. | 385/78 |
| 6,550,983 B1 * | 4/2003 | Gilliland et al. | 385/93 |
| 6,648,521 B2 * | 11/2003 | Roehrs et al. | 385/84 |
| 6,719,927 B2 * | 4/2004 | Sakurai et al. | 264/1.25 |
| 6,848,837 B2 | 2/2005 | Gilligan | 385/80 |
| 7,137,742 B2 | 11/2006 | Theuerkorn et al. | 385/53 |
| 7,226,222 B2 * | 6/2007 | Nagano et al. | 385/94 |
| 7,264,402 B2 | 9/2007 | Theuerkorn et al. | 385/59 |
| 7,281,859 B2 | 10/2007 | Mudd et al. | 385/76 |
| 2001/0007603 A1 * | 7/2001 | Sakurai et al. | 385/60 |
| 2002/0118928 A1 * | 8/2002 | Roehrs et al. | 385/84 |
| 2002/0146214 A1 * | 10/2002 | Tanaka et al. | 385/78 |
| 2003/0021548 A1 * | 1/2003 | Luther et al. | 385/86 |
| 2004/0234209 A1 | 11/2004 | Cox et al. | 385/86 |
| 2006/0034571 A1 * | 2/2006 | Nagano et al. | 385/94 |

FOREIGN PATENT DOCUMENTS

| | | |
|---|---|---|
| JP | 59-9614 | 1/1984 |

* cited by examiner

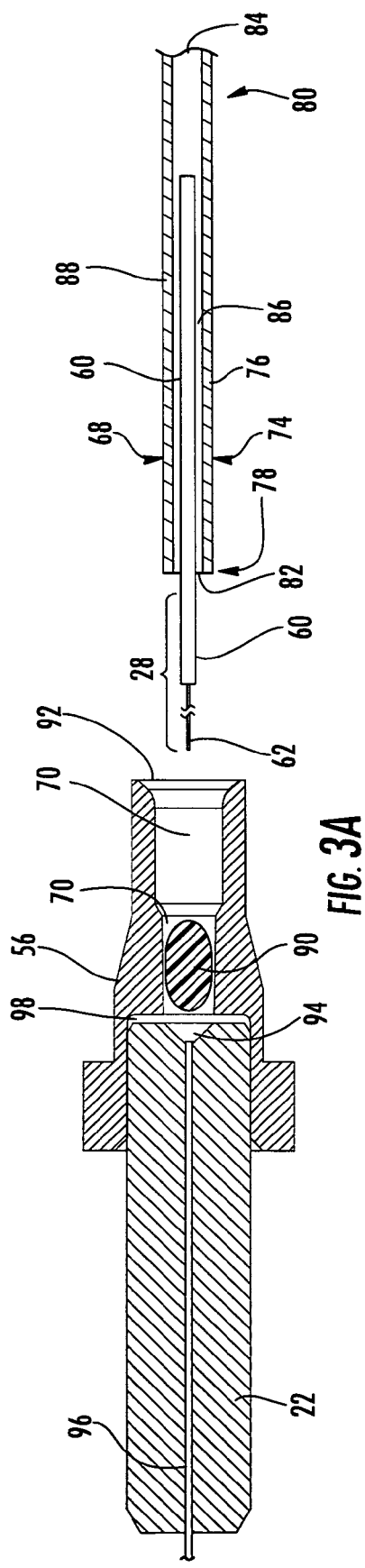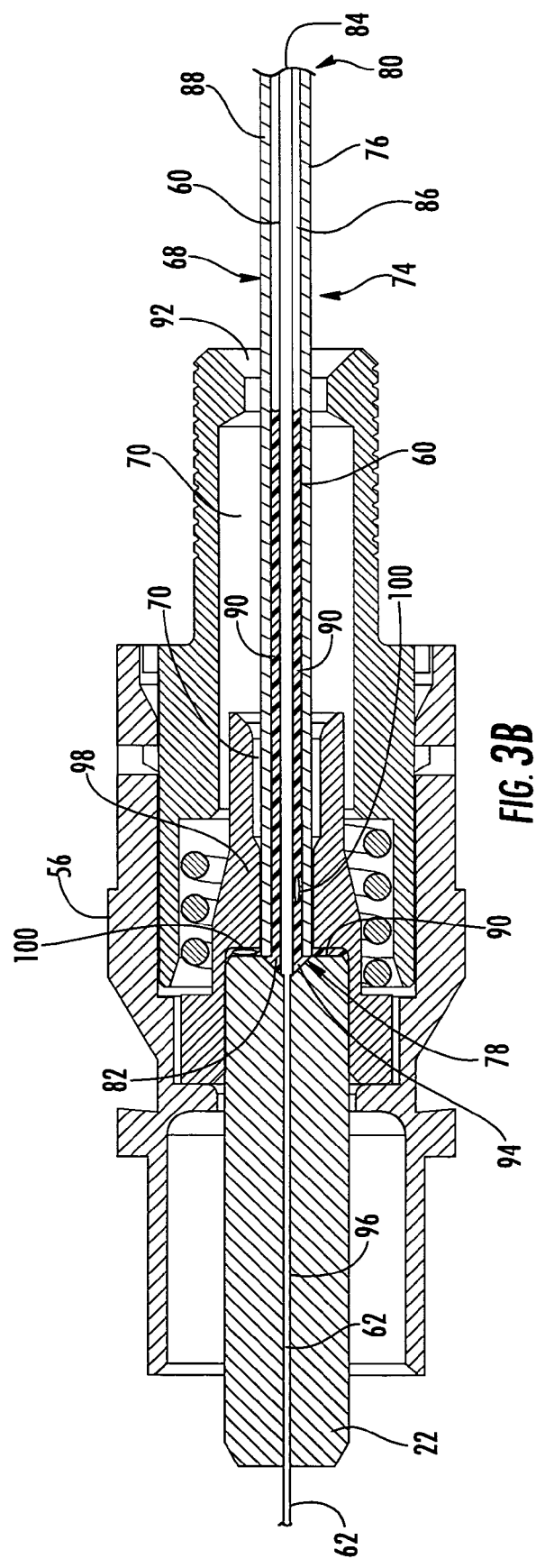

FIBER OPTIC CONNECTOR ASSEMBLY AND METHOD FOR VENTING GAS INSIDE A FIBER OPTIC CONNECTOR SUB-ASSEMBLY

BACKGROUND OF THE INVENTION

1. Field of the Invention

The present invention relates to a fiber optic connector assembly and method for venting gas, such as air, inside a fiber optic connector sub-assembly. More specifically, the present invention relates to a fiber optic connector assembly configured to receive a stiffener tube disposed about a portion of an optical fiber to support and guide the optical fiber, wherein the stiffener tube contains at least one opening to vent gas.

2. Technical Background

Optical fiber is increasingly being used for a variety of applications, including but not limited to broadband voice, video, and data transmission. Benefits of optical fiber use include extremely wide bandwidth and low noise operation. With the increasing and varied use of optical fibers, it is important to provide efficient methods of interconnecting optical fibers. Fiber optic connectors have been developed for this purpose. It is important that fiber optic connectors not significantly attenuate or alter the transmitted signal. In addition, the fiber optic connector should be relatively rugged and adapted to be connected and disconnected a number of times in order to accommodate changes in the optical fiber transmission path. The fiber optic connector should also be adapted for its environment. For example, outdoor interconnections may require a more rugged fiber optic connector that those designed for indoor interconnections. Because of the skill and equipment required for making optical fiber connections in the field, fiber optic cables are often pre-connectorized with fiber optic connectors for plug and play connectivity by the craft.

In this regard, a fiber optic connector typically employs a connector sub-assembly in the form of a pre-assembled ferrule holder module. The connector sub-assembly contains a ferrule holder that holds a ferrule. The ferrule holder has a passage extending therethrough that is axially aligned with a ferrule bore in the ferrule. An optical fiber extending from a stripped fiber optic cable is inserted into the ferrule holder passage and into the ferrule bore. After assembly and polishing, the ferrule of the completed assembly is suitable for optical interconnection with the ferrule of a complementary connector assembly for establishing an optical connection.

More specifically, the optical fiber is held within the fiber optic connector sub-assembly. To firmly secure the optical fiber to the fiber optic connector sub-assembly, a bonding agent, such as an epoxy, is typically applied to the inside of a portion of the ferrule holder passage before the optical fiber is inserted therethrough. The optical fiber is then inserted into the ferrule holder passage, through the bonding agent, and into the ferrule bore. Generally speaking, the bonding agent is disposed about the optical fiber in the ferrule holder passage for securing the same. If a fiber support stiffener tube is placed over top the optical fiber before insertion into the ferrule holder passage for support and guidance, the bonding agent is also disposed about the stiffener tube and may also enter an interstitial space formed between the inside surface of the stiffener tube and the outside surface of the optical fiber. After assembly, the bonding agent is hardened using a suitable curing process, thereby bonding (i.e., securing) the optical fiber/stiffener tube with the connector sub-assembly. The concepts of the present invention are directed to creating a robust bond among the connector sub-assembly, optical fiber, and/or stiffener tube.

SUMMARY OF THE INVENTION

In one embodiment of the present invention, a fiber optic connector assembly for venting gas inside a fiber optic connector sub-assembly is provided. The fiber optic connector assembly includes a connector sub-assembly including a ferrule and a ferrule holder having a passage extending therethrough. A stiffener tube having a tube body disposed about a portion of at least one optical fiber is provided to guide and support insertion of the at least one optical fiber into the ferrule holder passage. Gas, such as air, may be trapped inside the stiffener tube when inserted into a bonding agent placed inside the ferrule holder passage. To vent the trapped gas to prevent gas pockets from forming inside the bonding agent and compromising the optical fiber, the stiffener tube contains at least one opening in its tube body. The at least one opening in the tube body is configured to vent gas trapped inside the stiffener tube. The at least one opening in the tube body of the stiffener tube can also provide a means to vent gas pockets present in the bonding agent even if not caused by insertion of the stiffener tube into the ferrule holder passage.

In a further embodiment of the present invention, a method of assembling a fiber optic connector assembly to allow venting of gas inside in a fiber optic connector sub-assembly is provided. The method can include exposing at least one optical fiber contained in an end portion of a fiber optic cable; positioning a stiffener tube comprising a tube body and having at least one opening in the tube body, over the at least one optical fiber such that the stiffener tube is temporarily movable about the at least one optical fiber; applying a bonding agent inside a portion of a ferrule holder passage within the connector sub-assembly; and inserting an end of the stiffener tube disposed about the at least one optical fiber into the ferrule holder passage and into the bonding agent so that the at least one optical fiber extends beyond the ferrule. Gas, such as air, trapped inside the stiffener tube can be vented through the at least one opening in the tube body of the stiffener tube, thereby promoting retention of the optical fiber within the fiber optic connector.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

FIG. 3A is a cross-section view of the fiber optic connector sub-assembly of FIGS. 1 and 2 wherein a bonding agent is disposed inside a portion of a ferrule holder passage to retain at least one optical fiber inserted therein from a fiber optic cable;

FIG. 3B is a cross-section view of the fiber optic connector sub-assembly of FIGS. 1 and 2 showing a portion of the at least one optical fiber and a stiffener tube inserted into the ferrule holder passage and into the bonding agent disposed inside a portion of the ferrule holder passage;

DETAILED DESCRIPTION OF THE PREFERRED EMBODIMENTS

Figure 1:
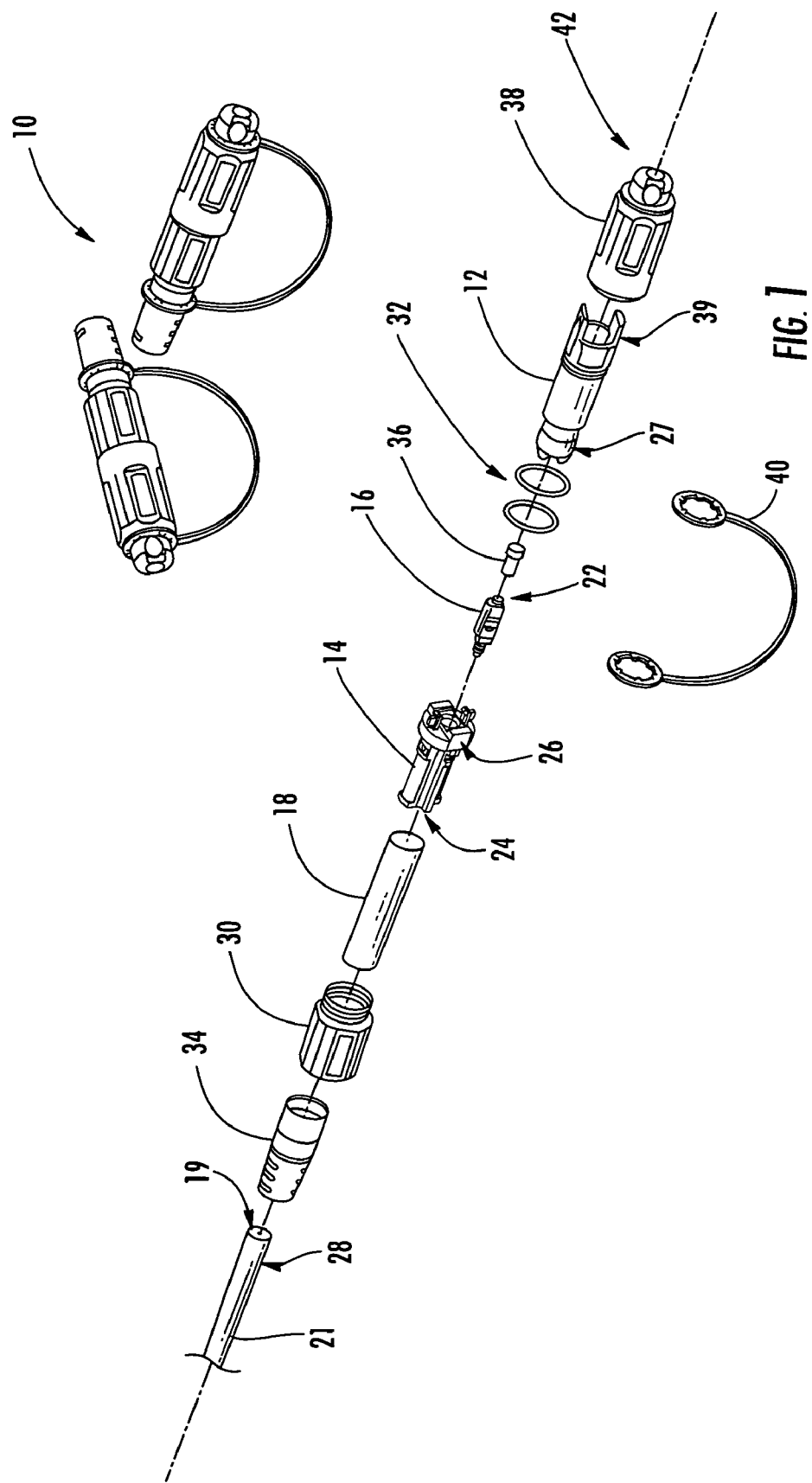
FIG. 1 is a perspective and exploded perspective view of an explanatory fiber optic connector according to one embodiment of the present invention.

Reference will now be made in detail to the preferred embodiments of the present invention, examples of which are illustrated in the accompanying drawings. Whenever possible, like reference numbers will be used to refer to like components or parts. The present invention is directed to structures and methods for creating robust bonding among the connector sub-assembly and the optical fiber/stiffener tube by using stiffener tubes having one or more openings in a tube wall for venting gas trapped during assembly. Gas, such as air, trapped inside the stiffener tube and/or bonding agent during the assembly process can adversely affect bonding, thereby resulting in an unacceptable failure rate in the field due to broken or moving optical fibers. Simply stated, a permanent gas pocket may be formed inside the bonding agent and/or the stiffener tube which can adversely affect the bonding of the optical fiber with the connector sub-assembly. For instance, the gas pocket may migrate toward the center of the bonding agent and around the optical fiber. When the gas pocket expands and contracts, such as during curing of the optical fiber and/or thermal cycling in the field, the optical fiber bond with the connector sub-assembly may weaken or break, thereby causing a catastrophic failure by severing the optical connection.

Trapping air in stiffener tube is especially problematic when the rear end of the stiffener tube is disposed in a fiber optic cable having a thixotropic grease or gel that inhibits the gas from escaping. As the stiffener tube and supported optical fiber are inserted into the bonding agent, the bonding agent pushes up into the interstitial space of the stiffener tube and displaces and compresses the air therein. If the thixotropic grease or gel in the fiber optic cable has a greater resistance than the bonding agent, the trapped air will enter into the bonding agent and form one or more air pockets therein since it cannot escape.

The embodiments described herein provide a fiber optic connector assembly and method for venting gas inside a fiber optic connector sub-assembly. The fiber optic connector assembly includes a connector sub-assembly including a ferrule and a ferrule holder having a passage extending therethrough. A stiffener tube having a tube body disposed about a portion of at least one optical fiber is provided for guiding and supporting the insertion of the at least one optical fiber into the ferrule holder passage. The stiffener tube inhibits gas pockets from forming inside the bonding agent and compromising bonding since it includes at least one opening in its tube body that allows venting of the gas, thereby ensuring a robust bond among the connector sub-assembly and the optical fiber/stiffener tube. The at least one opening in the tube body of the stiffener tube can also provide a means for venting gas pockets present in the bonding agent even if not caused by insertion of the stiffener tube into the ferrule holder passage (i.e., gas created during curing or the like). A method of assembling the fiber optic connector assembly is also provided, which may be a manual or automated process.

Before discussing specific aspects of present invention relating to a fiber optic connector assembly and related method for venting gas inside the fiber optic connector sub-assembly, an exemplary fiber optic connector and its components will first be described with respect to FIGS. 1 and 2. Referring to FIG. 1, an exemplary fiber optic connector 10 employing the present invention is illustrated, but other types of connectors can employ the concepts disclosed herein. Fiber optic connector 10 provides a hardened plug connector (i.e., suitable for outside plant deployment, but it may be used indoors as well) adapted for connection with a complementary receptacle. The fiber optic connector 10 includes a plug housing 12 in which a retention body 14 and a connector sub-assembly 16 are generally disposed during assembly. A heat shrink 18 is also utilized, as described in greater detail below. The retention body 14 facilitates optical coupling of at least one optical fiber 19 (also referred to as "optical fiber 19") of a fiber optic cable 20 to connector sub-assembly 16 having a ferrule 22. Optical fiber 19 of fiber optic cable 20 is surrounded by an outer jacket 21. A first portion 24 of retention body 14 engages and retains one or more strength members provided inside the fiber optic cable 20 for strain relief. A second portion 26 of retention body 14 engages and retains the connector sub-assembly 16.

Figure 6:
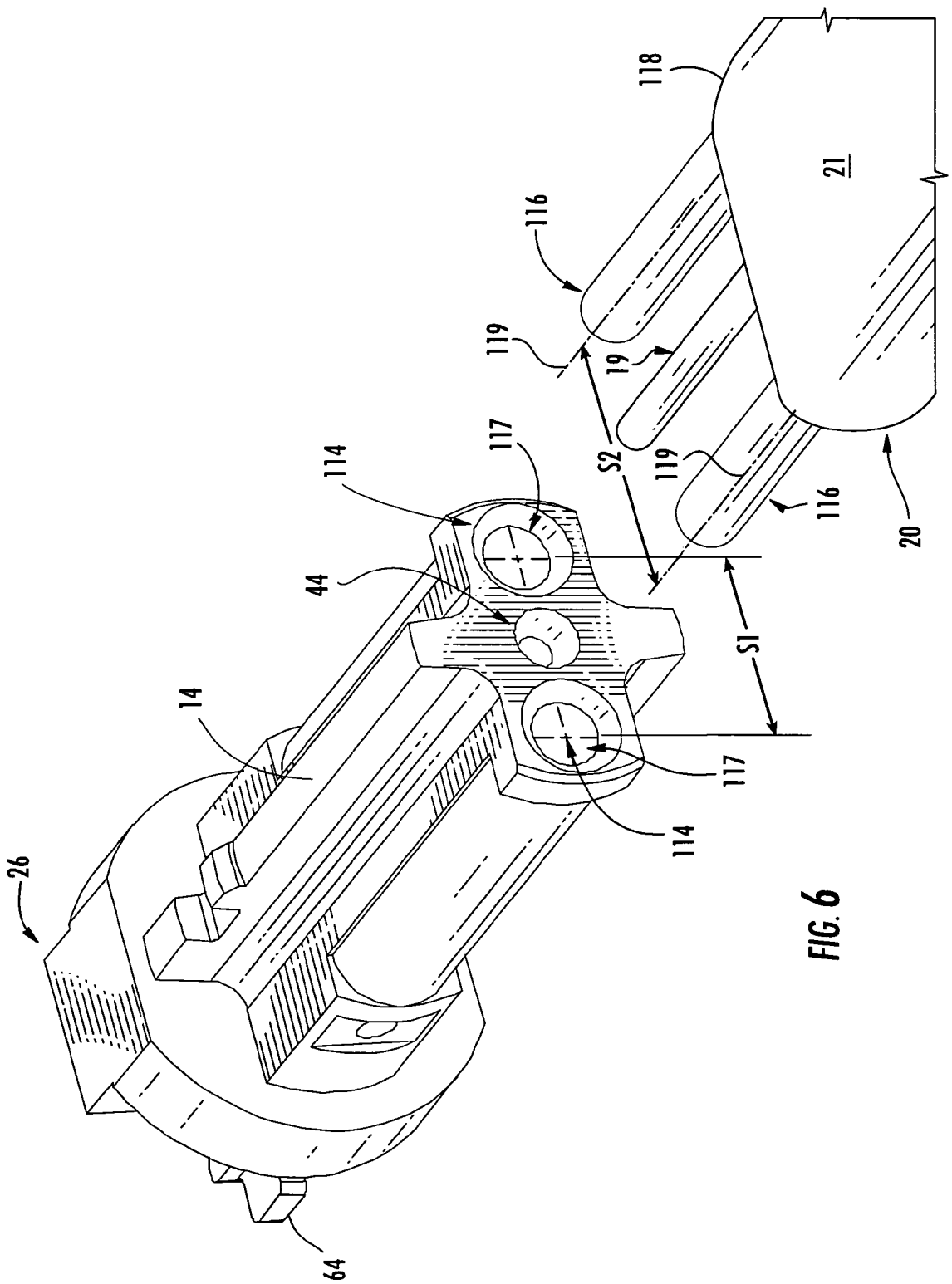
FIG. 6 is an isolated rear perspective view of a retention body illustrated in FIGS. 1 and 2, highlighting the joining of the strength members of a fiber optic cable with the retention body.

As best shown in FIG. 6, retention body 14 includes a central bore 44 extending therethrough that receives the optical fiber 19 for insertion into the connector sub-assembly 16 and into the ferrule 22. More detail regarding the retention body 14 and its engagement with the fiber optic cable 20 and connector sub-assembly 16 is described in greater detail below.

The heat shrink 18 is disposed about an end portion 27 of the plug housing 12 and an end portion 28 of the fiber optic cable 20, thereby providing a flexible environmental seal therebetween. As illustrated in this embodiment, the fiber optic cable 20 is a single-fiber drop cable and ferrule 22 is a single-fiber ferrule, although the use of other types of drop cables, optical fibers, connector types, and/or ferrules are possible. Fiber optic connector 10 also includes a coupling nut 30 that is externally threaded for engaging threads of a complementary connector, receptacle, bulkhead or the like (not shown), thereby aligning and optically mating ferrule 22 of fiber optic connector 10 and a complementary ferrule.

In this embodiment, fiber optic connector 10 also includes one or more silicone O-rings 32 that environmentally seal fiber optic connector 10 and receptacle, when joined, and a boot 34 that further relieves stress in fiber optic cable 20. Finally, fiber optic connector 10 can incorporate one or more dust caps 36, 38 that are used to selectively protect the ferrule 22 and an exposed end 39 of the plug housing 12. Preferably, the larger of the dust caps 38 (also referred to as the "pulling cap") is internally threaded such that it is configured to engage the external threading of coupling nut 30. Finally, pulling cap 38 may be secured to boot 34 via a lanyard 40 or other retention means, so that the pulling cap 38 is not easily lost. Pulling cap 38 also incorporates an integral pulling eye 42 designed for pulling the cable assembly into position.

Figure 2:
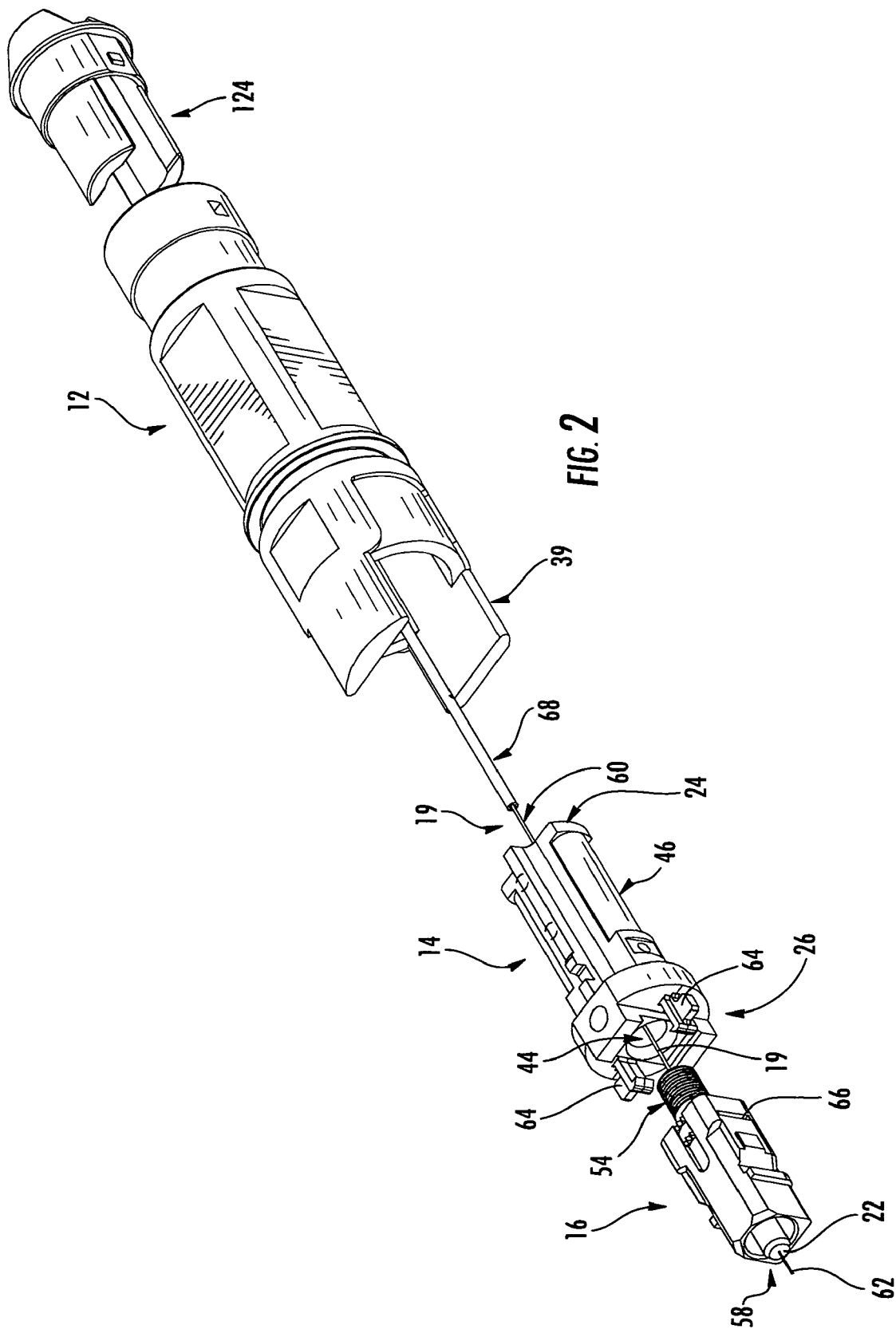
FIG. 2 is an exploded perspective view of portions of the fiber optic connector and employing a stiffener tube to guide at least one optical fiber through a fiber optic connector sub-assembly.

FIG. 2 is a partially exploded perspective view showing the exemplary plug housing 12, the retention body 14, the connector sub-assembly 16 of fiber optic connector 10, and their receipt of optical fiber 19 during assembly, thereby positioning optical fiber 19 within ferrule 22. During assembly, the retention body 14 is secured to strength members 116 of fiber optic cable 20, and end portion 28 of optical fiber 19 extends through central bore 44 of retention body 14 so that optical fiber 19 is received in a ferrule bore 96 (see FIG. 3A) of ferrule 22 of connector sub-assembly 16. Specifically, optical fiber 19, which extends through central bore 44 and out of the retention body 14, is then inserted into a rear end 54 of connector sub-assembly 16 through a ferrule holder passage opening 92 into a ferrule holder passage 70 (see FIG. 3A) defined by a ferrule holder 56 of connector sub-assembly 16. As best shown in FIGS. 2, 3A, and 3B, optical fiber 19 extends through ferrule holder passage 70, into ferrule bore 96 and extends from ferrule 22 at a front end 58 of the connector sub-assembly 16 for further processing such as cleaving, polishing, and the like as known in the art. When optical fiber 19 is fully inserted into the connector sub-assembly 16, a bare portion 62 of the optical fiber 19 extends through the ferrule 22 and is exposed at the front end 58 of connector sub-assembly 16. A coated portion 60 of optical fiber 19 is disposed inside the ferrule holder passage 70 as shown in FIG. 3A.

In this embodiment, retention body 14 is secured to the connector sub-assembly 16 via a pair of snap hooks 64 that are configured to engage snap hook recesses 66 disposed on opposing sides of the connector sub-assembly 16, but other structure may be used for engagement. Once plug housing 12 is secured over retention body 14 and snap hooks 64 engage sub-assembly 16, an interior surface of plug housing 12 may contact a surface of snap hooks 64, maintaining snap hooks 64 within snap hook recesses 66. Retention body 14 provided in this example of fiber optic connector 10 is also described in pending U.S. patent application Ser. No. 11/504,349 filed on Nov. 27, 2006 and entitled "RUGGEDIZED FIBER OPTIC CONNECTOR ASSEMBLY." Note that the present invention can be employed with any suitable type of optical fiber connector housing, including but not limited to SC, LC, FC, MT, MT-RJ housing.

As shown in FIG. 2 a stiffener tube 68 is disposed about a portion of optical fiber 19. Stiffener tube 68 provides support to the optical fiber 19 when inserted into ferrule holder 56 and into ferrule 22. Stiffener tube 68 may also assist in guiding optical fiber 19 through ferrule holder passage 70 so that optical fiber 19 is properly aligned with and extends into ferrule bore 96 of ferrule 22 without issue (i.e., stiffener tube 68 acts as a bushing to center optical fiber 19). This is illustrated in more detail with respect to FIGS. 3A and 3B.

As illustrated in FIG. 3A, stiffener tube 68 has a cylindrical-shaped and substantially hollow tube body 74 comprised of a tube wall 76. Tube body 74 of stiffener tube 68 is cut on each end 78, 80 such that orifices 82, 84 are exposed on each of the ends 78, 80. Stiffener tube 68 has a larger internal diameter than the outer diameter of the coated portion 60 of optical fiber 19. This allows stiffener tube 68 to be inserted over optical fiber 19. By way of example, the outer diameter of stiffener tube 68 may be about 900 micrometers (μm) and the inner diameter may be about 380 micrometers (μm). The outer diameter of the coated portion 76 of optical fiber 19 may have a nominal diameter of about 250 micrometers (μm), and consists of the bare portion 62 (i.e., the core and cladding) of the optical fiber 19 having an outer diameter of about 125 micrometers (μm), and a coating adding another approximately 125 micrometers (μm), and may optionally include an added outer ink layer adding another approximately three to four additional micrometers (μm). As best shown in FIG. 3A, a portion of coating and ink layer are stripped from the end of optical fiber 19 before inserting the same into ferrule holder 70.

Because the inner diameter of stiffener tube 68 is larger than the outer diameter of the coated portion 60 of optical fiber 19, an interstitial space 86 is formed by the space between an inner surface 88 of stiffener tube 68 and the outer surface of optical fiber 19. This interstitial space 86 allows stiffener tube 68 to move and retract (i.e., slide) about optical fiber 19 during assembly before stiffener tube 68 is bonded to optical fiber 19 inside ferrule holder passage 70. Stiffener tube 68 is slid onto the end of optical fiber 19 such that the bare portion 62 of optical fiber 19 is exposed outside of stiffener tube 68. Stiffener tube 68 is movable along the optical fiber 19 so that the end 80 of stiffener tube 68 is inserted into fiber optic cable 20. For instance, during assembly end 80 of stiffener tube 68 may extend into a buffer tube of fiber optic cable 20 that is filled with a thixotropic grease or gel, thereby inhibiting gas trapped within stiffener tube 68 from escaping.

Note that the lengths of the bare portion 62 and coated portion 60 of optical fiber 19 are not to scale in FIG. 3A. Bare portion 62 of optical fiber 19 should be of sufficient length to extend through ferrule bore 96. Likewise, the coated portion 60 of the optical fiber 19 should be of sufficient length to extend through the retention body 14 and through the ferrule holder passage 70.

After retention body 14 is secured to the strength members 116 of fiber optic cable 20 and stiffener tube 68 is placed over end portion 28 of optical fiber 19 so that optical fiber 19 can be inserted into ferrule holder passage 70 of connector sub-assembly 16. A bonding agent 90, such as a curable epoxy of other suitable bonding agent, is placed inside a portion of ferrule holder passage 70 before optical fiber 19 and stiffener tube 68 disposed thereabout are inserted. After curing, bonding agent 90 secures stiffener tube 68 and/or optical fiber 19 inside the ferrule holder passage 70 of connector sub-assembly 16. Bonding agent 90 is injected using a suitable device such as a needle inserted into ferrule holder passage 70.

Thereafter, optical fiber 19 and supporting stiffener tube 68 are inserted into ferrule holder passage opening 92 and into the ferrule holder passage 70.

As optical fiber 19 and stiffener tube 68 disposed thereabout are extended into ferrule holder passage 70, both will encounter and be inserted through the bonding agent 90. In this manner, bonding agent 90 will surround stiffener tube 68 and optical fiber 19 carried therein as illustrated in FIG. 3B. Bonding agent 90 will also extend into the interstitial space 86 inside stiffener tube 68 and around and inside a funneled lead-in opening 94 (also referred to as "funneled opening 94") leading to a ferrule bore 96 that extends to a front face of ferrule 22. Bonding agent 90 will surround optical fiber 19 and stiffener tube 68 inside ferrule holder passage 70 and funneled opening 94 to secure optical fiber 19 and/or stiffener tube 68 within the connector sub-assembly 16.

As optical fiber 19 and supporting stiffener tube 68 extend through bonding agent 90, the end portion 28 of optical fiber 19 will thereafter encounter the funneled opening 94 of ferrule 22. Funneled opening 94 has an initial internal diameter at a mating point 98 with the ferrule holder 56, but reduces in diameter leading to ferrule bore 96, which has a substantially constant internal diameter. The initial diameter of the funneled opening 94 may be designed to be slightly larger than the outer diameter of stiffener tube 68. In this manner, stiffener tube 68 will insert inside funneled opening 94 to provide a course alignment of stiffener tube 68 to the ferrule bore 96. However, the reducing diameter of the funneled opening 94 prevents stiffener tube 68 from extending into ferrule bore 96. Only the bare portion 62 of optical fiber 19 is sized to enter into ferrule bore 96. Because stiffener tube 68 is movable about optical fiber 19, the bare portion 62 of optical fiber 19 continues to extend into ferrule bore 96. In other words, stiffener tube 68 will remain abutted against or slightly inside funneled opening 94, but stiffener tube 68 will allow the bare portion 62 of optical fiber 19 to extend into and through ferrule bore 96.

In the illustrated embodiment, the inner diameter of ferrule bore 96 is large enough to accept the bare portion 62 of optical fiber 19. However, the inner diameter of ferrule bore 96 too small to accept the coated portion 60 of optical fiber 19. Thus, before the optical fiber 19 is placed through the ferrule holder passage opening 92 and into the ferrule holder passage 70, the coated portion 60 at the end portion 28 of optical fiber 19 is removed to expose bare portion 62 of the optical fiber 19. By way of example, the bare portion 62 has an outer diameter of about 125 micrometers and ferrule bore 96 has a diameter of about 126 micrometers.

It has been discovered that stiffener tube 68 can have a tendency to trap gas, such as air, when inserted into bonding agent 90 inside ferrule holder passage 70. Simply stated, bonding agent 90 enters inside the interstitial space 86 of the stiffener tube 68 and traps gas therein. The gas trapped inside the interstitial space 86 of the stiffener tube 68 will be compressed and pressurized especially if the gas cannot be released through the opposite end at fiber optic cable 20, such as when the fiber optic cable 20 is filled with a thixotropic grease or gel. If the thixotropic grease or gel filling in fiber optic cable 20 has a greater resistance than bonding agent 90, the trapped gas will enter into the bonding agent 90 as opposed to entering the thixotropic grease or gel in fiber optic cable 20. This will cause a gas pocket to be formed in or near bonding agent 90 which adversely affects the bond. This is illustrated by example in FIG. 3B.

FIG. 3B is a cross-section view of connector sub-assembly 16 of FIG. 3A, but with stiffener tube 68 and optical fiber 19 inserted into the ferrule holder passage 70 and into bonding agent 90 to illustrate the bonding problem. The end 78 of stiffener tube 68 is inserted into ferrule holder passage 70 and abuts funneled opening 94. A gas pocket 100 is shown as being formed inside bonding agent 90 as a result of inserting stiffener tube 68 into ferrule holder passage 70. Gas pocket 100 can occur at a variety of location, but is most problematic when it is formed near the intersection between funnel opening 94 and ferrule bore 96. Gas pocket 100 may remain permanently formed inside the bonding agent 90 during curing and after assembly.

Gas pocket 100 could be formed as a result of bonding agent 90 displacing and compressing gas, such as air, inside stiffener tube 68 when inserted into ferrule holder passage 70. The thixotropic grease or gel in fiber optic cable 20 or the optical fiber 19 itself may act as a piston to compress gas, such as air, inside stiffener tube 68 when inserted into ferrule holder passage 70. Further, gas pocket 100 may already be present or formed in bonding agent 90 before stiffener tube 68 is inserted. Any such gas pocket 100 can provide a weak point in the interconnection among connector sub-assembly 16, optical fiber 19, and/or stiffener tube 68. Expansion and contraction of the gas pocket 100 could break optical fiber 19 or its bond to the connector sub-assembly. For example, the gas pocket 100 could expand and contract during curing such that the optical fiber 19 is broken during the curing process. If heat curing is used to cure bonding agent 90, expansion and contraction of gas pocket 100 may be of even greater concern. Heat curing typically tends to cause trapped air, such as the gas pocket 100, to expand to a greater volume over other types of curing. If optical fiber 19 survives the curing process, the gas pocket 100 may tend to migrate toward the center of the bonding agent 90 and around the optical fiber 19 in the field. This may cause the optical fiber 19 to break in the field at the location of the gas pocket 100 as a result of optical fiber 19 not being held securely inside the connector sub-assembly 16.

Figure 4:
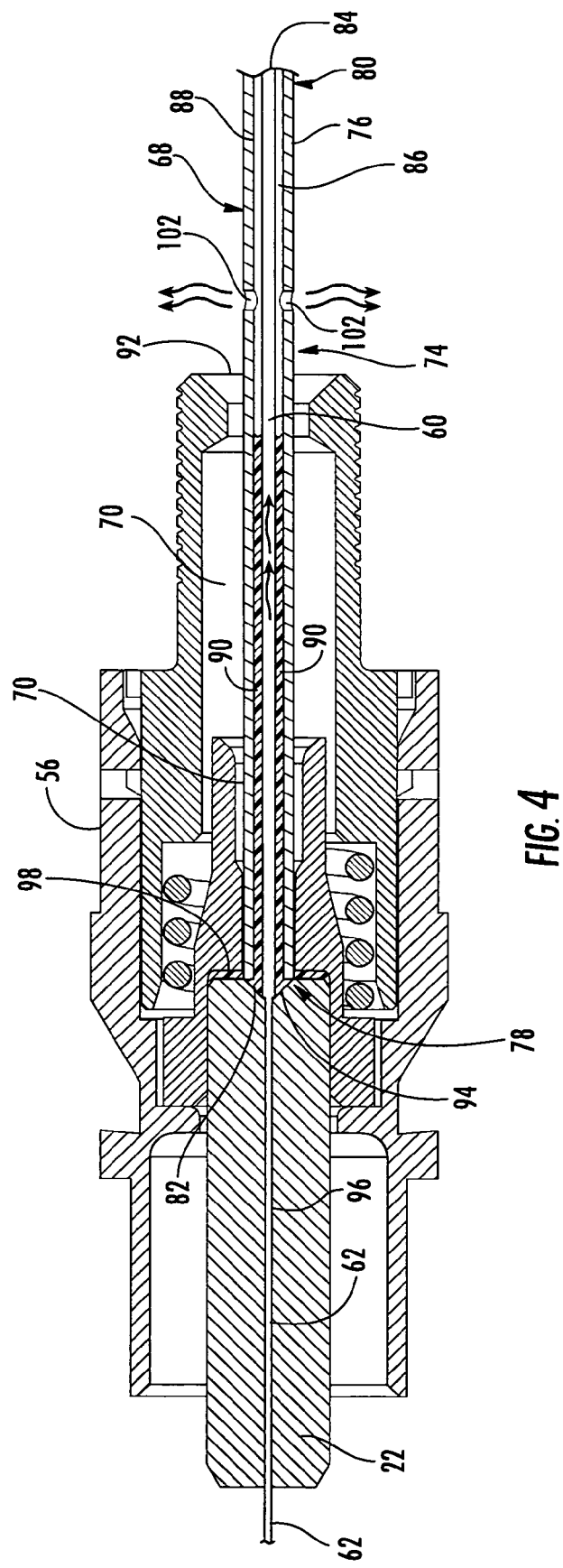
FIG. 4 is a similar cross-section view of the fiber optic connector sub-assembly illustrated in FIGS. 3A and 3B, but employing a stiffener tube adapted to vent gas contained inside the stiffener tube and/or the bonding agent, according to one embodiment of the present invention.

FIG. 4 illustrates a similar cross-section view of connector sub-assembly 16 illustrated in FIGS. 3A and 3B, but employing a stiffener tube 68 according to one embodiment of the present invention. Stiffener tube 68 illustrated in FIG. 4 is configured to vent gas, such as air, trapped inside stiffener tube 68. Specifically, tube wall 76 of stiffener tube 68 contains one or more openings 102. The one or more openings 102 are adapted to release any trapped air inside stiffener tube 68 during assembly. The one or more openings 102 provide a release mechanism so gas, such as air, trapped inside stiffener tube 68 inhibits the formation of gas pockets 100. The one or more openings 102 in stiffener tube 68 will have less resistance than bonding agent 90 or a thixotropic grease or gel disposed in fiber optic cable 20. Thus, the one or more openings 102 will vent (i.e., allow the release of) any trapped gas inside stiffener tube 68 before the gas will enter into the bonding agent 90 to form gas pocket 100. Even if gas pockets 100 do not initially form in bonding agent 90, or bonding agent 90 includes gas pockets 100 before stiffener tube 68 is inserted into ferrule holder passage 70, the one or more openings 102 provide a mechanism to allow the gas to be released.

In the embodiment illustrated in FIG. 4, the one or more openings 102 consist of two openings 102. The two openings 102 were formed as a result of directing a single laser beam across the stiffener tube 68 to create the opening, but other suitable methods for creating openings 102 are possible. For instance, the openings 102 can be formed during the manufacturing process such as on an automated assembly line that feeds, creates openings, and cuts the stiffener tube from a bulk reel as needed. An opening in each side of tube wall 76 resulted from the single laser beam entering and exiting both sides of tube wall 76. However, any number of openings 102 can be provided in stiffener tube 68. Additionally, a single opening 102 may be is sufficient if it is located in the proper position, but providing multiple openings 102 makes placement less critical. Further, the one or more openings 102 can be located anywhere along the tube body 74 between the ends 78, 80 of the stiffener tube 68. Moreover, if one or more openings 102 are located in the bonding agent 90 or the thixotropic grease or gel of the fiber optic cable 20, they will not be effective. This is because these openings 102 will be clogged by bonding agent 90 or thixotropic grease or gel so that any trapped gas inside the stiffener tube 68 will not be able to escape through the one or more openings 102.

Thus, the one or more openings 102 are preferably located in a portion of the tube body 74 that remains outside the ferrule holder passage 70 when stiffener tube 68 is fully inserted into ferrule holder passage 70, as is illustrated in FIG. 4. Alternatively, the one or more openings 102 can be located in a portion of tube body 74 that will be located inside ferrule holder passage 70 when stiffener tube 68 is fully inserted into ferrule holder passage 70. Further, the one or more openings 102 can comprise one or more openings in tube body 74 that are located both inside and outside the ferrule holder passage 70 when stiffener tube 68 is fully inserted into ferrule holder passage 70. It is also acceptable for the one or more openings 102 to be located along tube body 74 of stiffener tube 68 where the bonding agent 90 may reach when displaced into the interstitial space 86 of stiffener tube 68. This is because the surface tension of bonding agent 90 is typically such that it will not penetrate through the relatively small openings 102, thereby inhibiting wicking into undesired areas.

The one or more openings 102 are to be distinguished from the orifices 82, 84 formed on the ends 78, 80 of the tube body 74 as a result of the tube body 74 being cut. Orifices 82, 84 are disposed in the thixotropic grease or gel of the fiber optic cable 20 and into the bonding agent 90, respectively. Thus, the orifices 82, 84 at the ends 78, 80 of the stiffener tube 68 will be clogged and will not be able to release trapped gas, other than into the bonding agent 90, which is not desired as discussed above. The one or more openings 102 of stiffener tube 68 are not located at the ends 78, 80 of stiffener tube 68, but instead along tube body 74 of stiffener tube 68, between the ends 78, 80, at any location desired.

The one or more openings 102 are preferably formed in stiffener tube 68 with a suitable size and/or shape so long as the tube body 74 is not weakened to a point where it cannot perform its intended function of being a guide (i.e., stiffener tube should not be so weakened that it buckles causing assembly issues). In a preferred embodiment, the one or more openings 102 may be approximately between 150-300 micrometers (μm) in diameter. If the inner diameter of the stiffener tube 68 is approximately 900 micrometers (μm), it may not be desired to place an opening 102 in the tube wall 76 greater than 400 micrometers (μm) in diameter so that the tube body 74 is not excessively weakened.

Any suitable material is possible for stiffener tube 68. The material should withstand the curing process used for the bonding agent 90 and thermoplastics may be a particularly well suited for use because thermoplastics soften when heated and harden when cooled. Further, thermoplastics have higher melting points that can withstand heat curing without melting. Examples of thermoplastics that are possible for constructing the stiffener tube 68 include fluoropolymers, such as Tetrafluoroethylene (TFE), Polytetrafluorethylene (PTFE), and Polyvinylidene Fluoride (PVDF). The stiffener tube 68 may also be construed out of a Teflon®-based material, which contains a PTFE.

Further, the one or more openings 102 can also be provided as an inherent property of the material used in the stiffener tube 68. In other words, the material used for the stiffener tube 68 may be a porous material that allows trapped gas to release as an inherent function of the material. A porous material of any suitable type is possible. For example, the porous material may include a mesh structure. The material used for stiffener tube 68 may also be a permeable material. As used herein, any of the materials that by their inherent characteristics, are adapted to release gas, are considered as having an opening or openings with the meaning and construction of the one or more openings 102.

Figure 5:
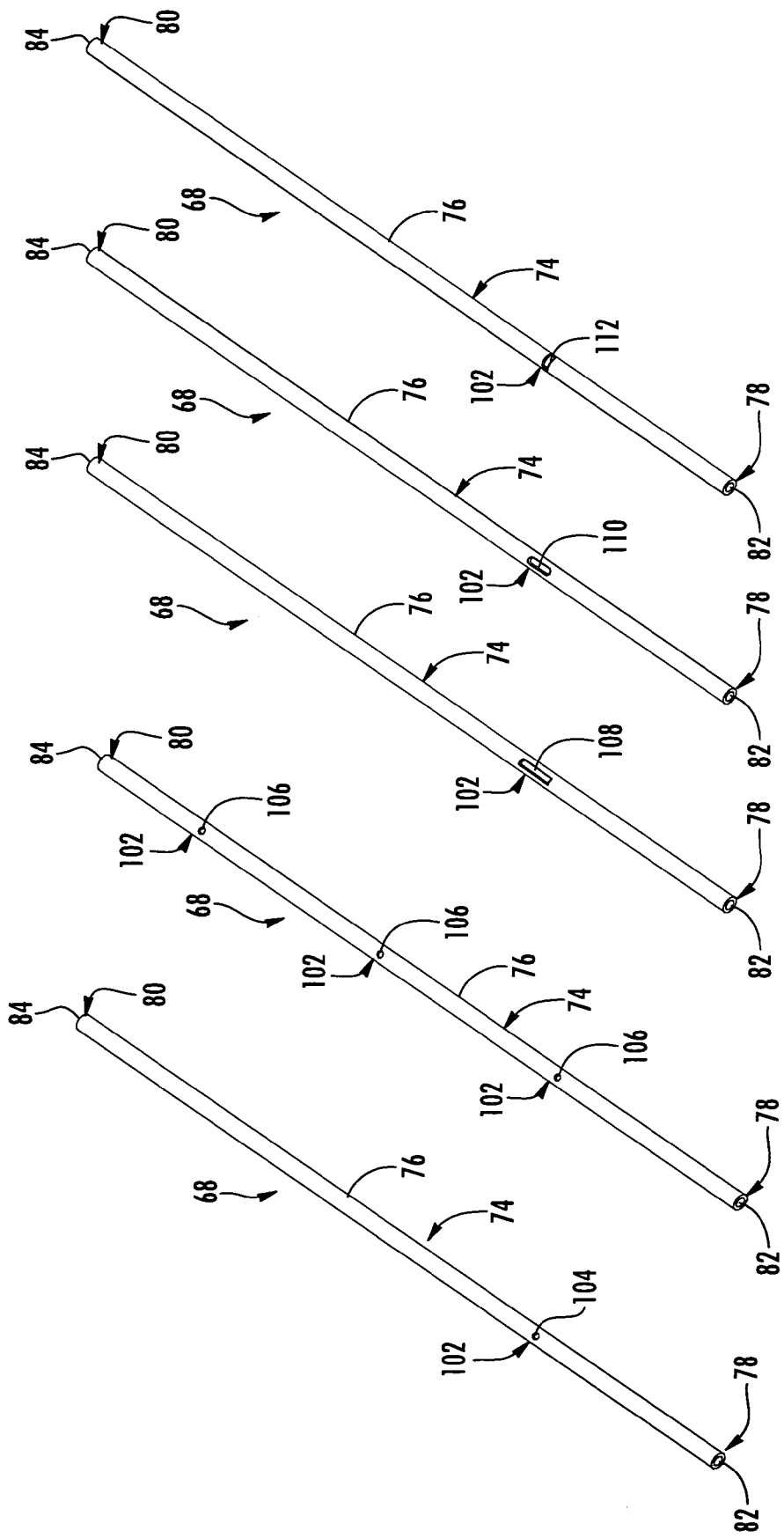
FIG. 5A illustrates an embodiment of the stiffener tube employing an opening in the tube body of the stiffener tube for venting gas when inserted into a fiber optic connector sub-assembly according to one embodiment of the present invention.
FIGS. 5B-5E illustrate alternative embodiments of the stiffener tube employing alternate opening structures in the tube body of the stiffener tube to vent gas when inserted into a fiber optic connector sub-assembly according to one embodiment of the present invention.

FIGS. 5A-5E illustrate various embodiments of the one or more openings 102 that may be provided in stiffener tube 68 as examples. In FIG. 5A, stiffener tube 68 is provided having only one opening 102 in tube body 74. The opening 102 is an orifice 104 of a substantially circular shape. Depending on which end 78, 80 of the stiffener tube 68 is first inserted over optical fiber 19, the opening 102 may be located inside ferrule holder passage 70 or outside ferrule holder passage 70 when the stiffener tube 68 is fully inserted into the ferrule holder passage 70 during assembly.

FIG. 5B illustrates another stiffener tube 68 having multiple openings 102 in the form of multiple orifices 106 located along tube body 74. In this manner, the openings 102 in tube body 74 will be located both inside and outside ferrule holder passage 70 when the stiffener tube 68 is fully inserted into ferrule holder passage 70 during assembly. By way of example, the multiple openings 102 can be spaced apart at approximately 5 millimeter (mm) intervals, but other spacings are possible. Using a stiffener tube 68 having multiple openings 102 along tube body 74 may be advantageous, because allows assembly without having to know the precise location of the openings 102 relative to ferrule holder passage 70.

Further, the one or more openings 102 may have any shape desired. The shape of the one or more openings 102 may be influenced by the drilling or cutting mechanism used to form the one or more openings 102 in tube body 74 of stiffener tube 68. The shape of the one or more openings 102 may also be influenced by the orientation and/or movement or lack of movement by the stiffener tube 68 during cutting or drilling. For example, the cutting mechanism may be a laser that fires a laser beam in the form of a point. If stiffener tube 68 is stationary during drilling, lasing or the like, a substantially circular orifice in the tube body 74 is formed. If stiffener tube 68 is rotated about its longitudinal axis during formation, an oval or slit shaped orifice will be formed in tube body 74. FIG. 5C illustrates an example of yet another stiffener tube 68 having an opening 102 in the form of a slit 108. FIG. 5D illustrates still another stiffener tube 68 having an opening 102 in the form of an oval cut orifice 110. A ring cut shaped opening may be formed if the stiffener tube 68 is rotated substantially during forming. FIG. 5E illustrates another stiffener tube 68 having an opening 102 in the form of a partial ring cut 112.

Figure 7:
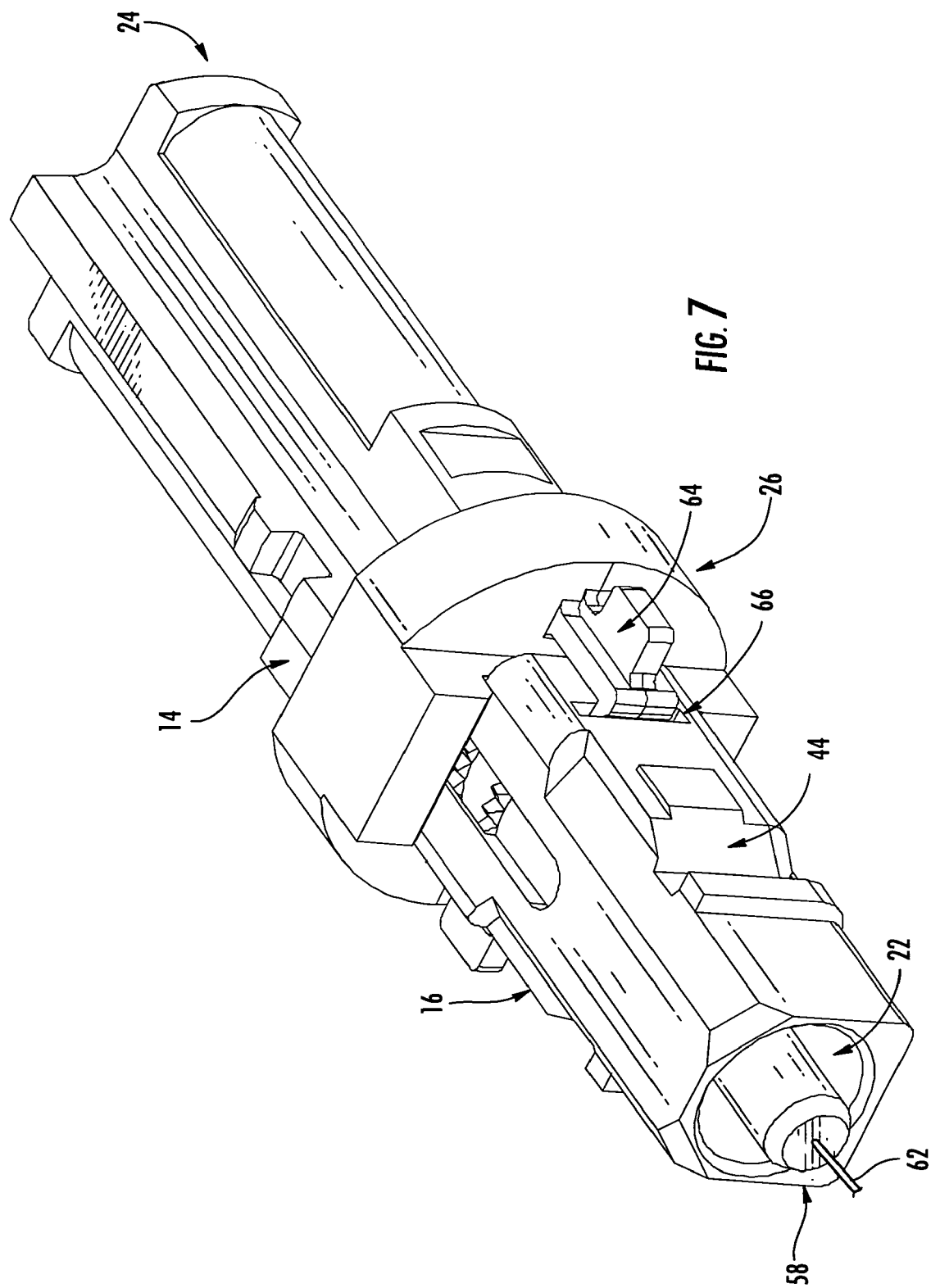
FIG. 7 is an isolated front perspective view of an assembled retention body and fiber optic connector sub-assembly of FIGS. 1 and 2 with the at least one optical fiber extending through a ferrule according to one embodiment of the present invention.
Figure 8:
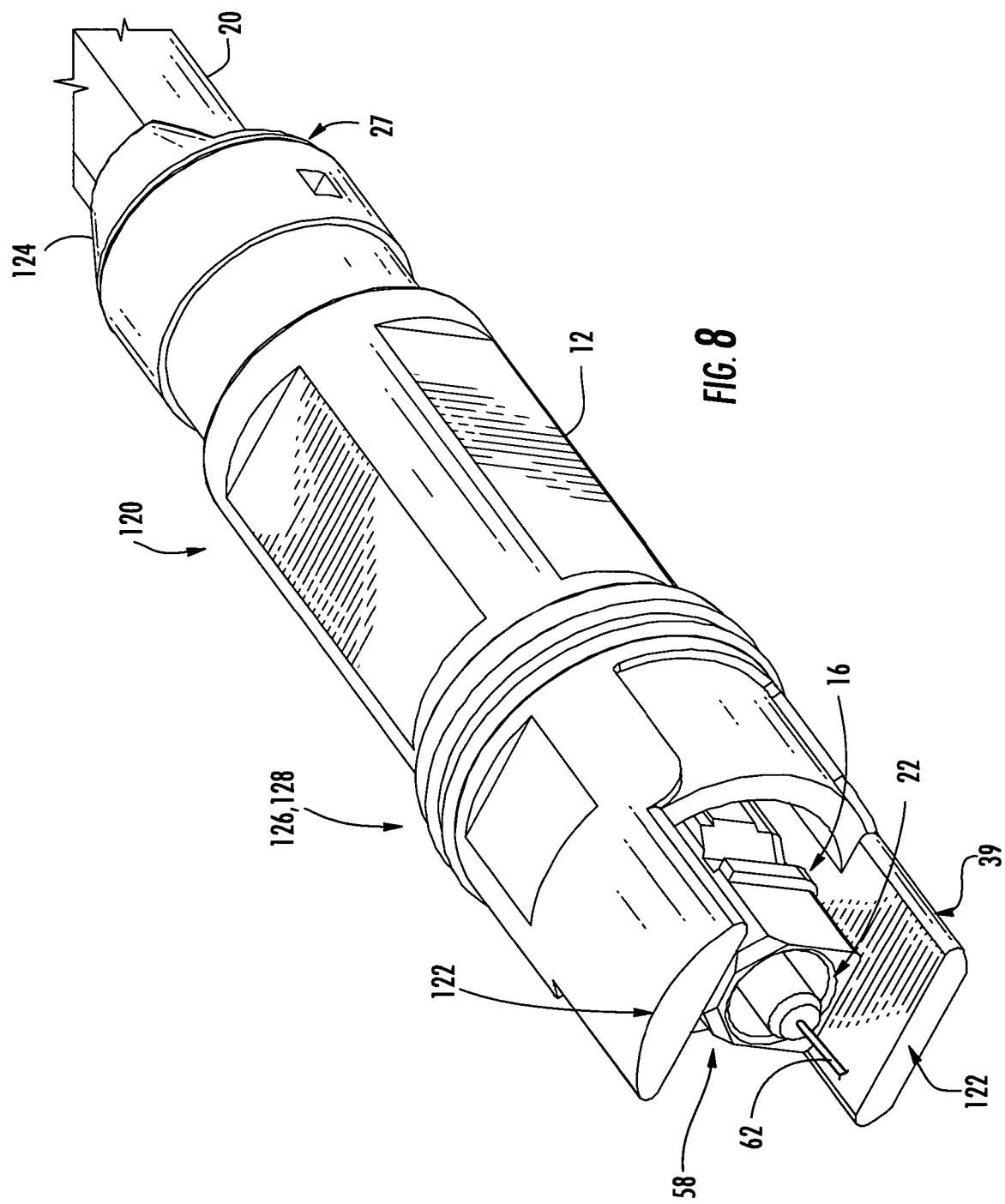
FIG. 8 is an isolated perspective view of the assembled fiber optic connector of FIGS. 1 and 2 shown with the dust cap removed.

FIGS. 6-8 illustrate more detail on components and assembly for the exemplary connector 10 discussed with the concepts of the present invention. FIG. 6 illustrates a rear view of retention body 14 used to secure the fiber optic cable 20 and interconnect connector sub-assembly 16. More specifically, retention body 14 includes central bore 44 positioned to receive at least one optical fiber 19 of fiber optic cable 20 and a pair of edge channels 114 positioned to receive strength members 116 such as glass reinforced plastic (GRP) strength members or other suitable strength members of fiber optic cable 20. As depicted, fiber optic cable 20 includes has optical fiber 19 and strength members 116 disposed within a cable sheath 118, as is well known to those of ordinary skill in the art. In one embodiment, the pair of edge channels 114 are filled with an adhesive or the like that serves to bond the strength members 116 of fiber optic cable 20 to the retention body, but other mechanical retention methods are possible. The adhesive can be a visible light curable epoxy, or an ultraviolet (UV) light, air or heat curable glue. As will discussed in more detail later in this application, retention body 14 may also be manufactured such that a spacing S1 between center points or axes 117 of the edge channels 114 is different such as less than a spacing S2 between center points or axes 119 of the strength members 116. This provides a resistance between the strength members 116 and the edge channels 114 to further promote retention of the strength members 116 of the fiber optic cable 20 to the retention body 14 during assembly (i.e., a friction fit for holding while curing).

FIGS. 7 and 8 show components of the fiber optic connector 10 attached after optical fiber 19 is placed through the ferrule bore 96 in accordance with the description above. Referring to FIG. 7, the retention body 14 is secured to the connector sub-assembly 16 via the pair of snap hooks 64 that are configured to engage the snap hook recesses 66 disposed on opposing sides of connector sub-assembly 16. The snap hooks 64 retain the connector sub-assembly 16.

Referring to FIG. 8, a connector assembly 120, also referred to herein as a "plug," of the present invention includes the plug housing 12 that protects the connector sub-assembly 16 and provides alignment with a complementary receptacle. Connector sub-assembly 16 and ferrule 22 are accessible through one open end of the plug housing 12, such that the ferrule 22 can be optically connected to the ferrule of the complementary receptacle or other suitable connector assembly. Additionally, retention body 14 and plug housing 12 may be keyed to allow assembly only in one specific orientation. In this manner, the retention method does not allow multiple ways (i.e., two 180-degree opposing ways) to assemble the connector 10 components, thereby eliminating the requirement for fixturing and verification by an operator in order to make sure that connector sub-assembly 16 is oriented properly. Plug housing 12 may also include an end cap 124. The one or more silicone O-rings 32 (FIG. 1) of fiber optic connector 10 may be replaced with a single integrally formed and overmolded O-ring 126 that is disposed within a recessed channel 128 that is manufactured into the exterior surface of the plug housing 12. Optionally, the exterior surface of the plug housing 12 includes a number of convenient gripping surfaces.

Against the backdrop of fiber optic connector 10 and its components illustrated in the figures and described above, an embodiment of a method for assembling a fiber optic connector assembly to allow venting of gas trapped in a fiber optic connector assembly will now be discussed. This method will be described in connection with illustrated examples and embodiments, but this method may be employed with any cable, any connector sub-assembly, and/or any supporting components. Further, this method can be performed using automation.

In this embodiment, before optical fiber 19 of fiber optic cable 20 is inserted into fiber optic connector 10 components, the optical fiber 19 is first exposed from fiber optic cable 20 at the desired length to form the end portion 28 (illustrated in FIG. 3A). A portion of the outer jacket 21 is removed to expose the end portion 28 of optical fiber 19. The portion of the outer jacket 21 will be removed such that the desired and necessary length of the coated portion 60 of the optical fiber 19 is exposed. A portion of the exposed coated portion 60 of the optical fiber 19 is cleaned from any residual filling, such as gel or grease, that may be disposed on the exposed coated portion 60 after removal of the outer jacket 21. The coated portion 60 of the optical fiber 19 exposed should be sufficient to be inserted through any supporting components and connector sub-assembly 16 such that the bare portion 62 of the optical fiber 19 can be fully inserted through and extend out of the ferrule bore 96 of connector sub-assembly 16.

When deciding the length of the coated portion 60 of the optical fiber 19 to be exposed, the amount of force necessary to push the optical fiber 19 through the ferrule holder passage 70 and through the bonding agent 90 inside the ferrule holder passage 70 can be taken into account. Depending on the force required to be exerted, some of the exposed coated portion 60 of the optical fiber 19 may be pushed back into the fiber optic cable 20 inside the outer jacket 21. This is called "fiber stuffing." The amount of optical fiber 19 pushed back into fiber optic cable 20 will depend on the nature of the fiber optic cable 20, connector sub-assembly 16, and the viscosity and/or other properties of the bonding agent 90 and any thixotropic grease or gel within fiber optic cable 20. Thus, when trimming the exposed coated portion 60 of the optical fiber 19 to prepare it for connection, it may be desirable to leave an additional length of the coated portion 60 of the optical fiber 19 substantially equal to the expected amount of push back. In one embodiment, approximately two millimeters (mm) of optical fiber 19 is expected to be pushed back into fiber optic cable 20 when the exposed coated portion 60 of the optical fiber 19 is fully inserted into the ferrule holder passage 70.

In one embodiment, as illustrated in FIG. 6, fiber optic cable 20 also includes a pair of GRP strength members 116 that extend on each side of optical fiber 19. Because the strength members 116 do not generally extend to connector sub-assembly 16, the strength members 116 may be required to be trimmed next so that they are of the correct length to be inserted into the pair of edge channels 114 in the retention body 14. Strength members 116 and coated portion 60 of the optical fiber 19 are then inserted into retention body 14. An adhesive is placed inside the edge channels 114 before strength members 116 are inserted therein. The coated portion 60 of the optical fiber 19 is passed through the central bore 44 of retention body 14.

The adhesive will eventually be cured to solidly bond the strength members 116 to the edge channels 114 of retention body 14, but curing is not yet performed at this stage in this embodiment. Curing is performed when the optical fiber 19 is cured inside connector sub-assembly 16 (i.e., one curing process for both adhesives). The adhesive may be sufficient to firmly hold the strength members 116 inside the edge channels 114 for the assembly process until curing is performed.

In other embodiments, the spacing S2 between the center points or axes 119 of the strength members 116 disposed in fiber optic cable 20 can be designed to be different such as less (or more) than the spacing S1 between the center points or axes 117 of the edge channels 114 of the glue body 46 (see FIG. 6). Thus, as the strength members 116 are inserted into the edge channels 114 of retention body 14, a resistance will be present between the strength members 116 and the edge channels 114 due to the distance between the strength members 116 being slightly less than the distance between edge channels 114. The edge channels 114 will force the strength members 116 to separate slightly from each other as the strength members 116 are inserted into the edge channels 114. A force may be required to push or "jam" the edge channels 114 of the glue body 46 onto strength members 116. In one embodiment, the difference in spacing (S1 and S2) between the strength members 116 and the edge channels 114 may be between approximately 0.1 to 1.0 millimeters (mm). Illustratively, the distance between center points of the edge channels 114 may be approximately 6.0 millimeters (mm), for example, while the distance between center points of the strength members 116 may be approximately 5.5 millimeters (mm).

At this point in the manufacturing process, the coating of optical fiber 19 has not been removed to expose the bare portion 62 therein. Optical fiber 19 has also not been inserted into the ferrule holder passage 70 of connector sub-assembly 16, nor has the glue body 46 been attached to connector sub-assembly 16. The coated portion 60 of the optical fiber 19 is extending through the central bore 44 and the second portion 26 of the glue body 46. Before the optical fiber 19 can be inserted into the ferrule holder passage 70 and into the ferrule bore 96, some coating on the end portion 28 of the optical fiber 19 is removed to expose the bare portion 62 of the optical fiber 19. The length of the bare portion 62 of the optical fiber 19 should have a length necessary to extend from the funneled opening 94 of the ferrule bore 96 to be exposed through the front end of ferrule 22.

Next, stiffener tube 68 is placed onto the end portion 28 of optical fiber 19. At this point, the end portion 28 comprises both the bare portion 62 and the coated portion 60 of the optical fiber 19. The end portion 28 of the optical fiber 19 is extending from the central bore 44 of retention body 14 in the illustrated embodiment. As previously discussed, stiffener tube 68 is used to support insertion of the optical fiber 19 into ferrule holder passage 70. If stiffener tube 68 is not made from a material that by its nature has openings, such as would be present if using a porous or permeable material, one or more openings 102 are formed in stiffener tube 68 before insertion of optical fiber 19 into ferrule holder passage 70. The one or more openings 102 can be formed in stiffener tube 68 before or formed as stiffener tube 68 is being inserted onto the end portion 28 of optical fiber 19.

If the one or more openings 102 are formed in the stiffener tube 68 as it is inserted onto the end portion 28 of the optical fiber 19, the one or more openings 102 should be placed on portions of the tube body 74 that have not yet received the end portion 28 of the optical fiber 19. Otherwise, the process of forming one or more openings 102 in the tube body 74 may damage the optical fiber 19 therein. In this instance, after the one or more openings 102 are formed in tube body 74, the remaining portion of stiffener tube 68 is placed over top of the end portion 28 of the optical fiber 19. As previously discussed, the one or more openings 102 may be placed into the stiffener tube 68 using a laser or other suitable cutting or drilling mechanism. The opening 102 may be drilled or cut into or through both sides of the tube body 74 by the laser as the stiffener tube 68 is unrolled or wound from a bulk supply during assembly. An automated machine and process may be used to feed the stiffener tube 68 along the laser at specific locations and times, wherein the laser cuts the one or more openings 102 in the tube body 74 for preparing stiffener tube 68 for use in connector sub-assembly 16.

Stiffener tube 68 is then inserted first over the end portion 28 of the optical fiber 19 and pushed fully down over end portion 28 of optical fiber 19 to prepare to optical fiber 19 for insertion into ferrule holder passage 70. In one embodiment, the stiffener tube 68 is pushed down slightly farther than the end of the bare portion 62 on end portion 28 of optical fiber 19 so that the bare portion 62 can be visually inspected. If optical fiber 19 has been damaged during the preparation process at this point, the damage can be detected by inspecting the bare portion 62 extending past stiffener tube 68.

Optical fiber 19 and stiffener tube 68 disposed thereabout are now ready to be inserted into ferrule holder passage 70. Before insertion, the bonding agent 90 is placed inside a portion of the ferrule holder passage 70 (see, e.g., FIG. 3A). Bonding agent 90 may be injected inside the ferrule holder passage 70 using a needle or other suitable device. Optical fiber 19 and stiffener tube 68 having one or more openings 102 is inserted into ferrule holder passage 70 and through bonding agent 90. As discussed above, stiffener tube 68 will provide a course alignment of the optical fiber 19 to the ferrule bore 96 and stiffener tube 68 will abut against or slightly enter the funneled opening 94. Optical fiber 19 can continue through ferrule bore 96 and the bare portion 62 of the optical fiber 19 will move through the stiffener tube 68 until the coated portion 60 of the optical fiber 19 encounters and rests inside the funneled opening 94 (see, e.g., FIG. 4). Any gas, such as air, trapped inside the interstitial space 86 of the stiffener tube 68 is vented through one or more openings 102 in stiffener tube 68. (see, e.g., FIG. 4). This prevents the trapped gas from forming one or more gas pockets 100 in bonding agent 90. Further, if any gas pockets 100 are already present in the bonding agent 90, those gas pockets 100 may also be vented through the one or more openings 102 in the stiffener tube 68.

After the bare portion 62 of the optical fiber 19 is extended through ferrule bore 96, the retention body 46 is latched to connector sub-assembly 16 as previously described and illustrated in FIG. 7. The bare portion 62 of the optical fiber 19 will extend through the ferrule 22, also as illustrated in FIG. 7. Connector sub-assembly 16 with attached retention body 46 are then cured to harden the bonding agent 90 and the adhesive in the edge channels 114 of the glue body 46. Connector sub-assembly 16 connected to the retention body 14 and fiber optic cable 20 may be placed in an oven to cure. During curing, the bonds between the bonding agent 90 and the stiffener tube 68 and optical fiber 19, as well as adhesive between strength members 116 and the edge channels 114 are solidified. Any type of curing may be employed, including but not limited to, heat curing, visible light curing, and ultraviolet light curing. After curing, the bare portion 62 of the optical fiber 19 extending through the ferrule 22 is then cleaved and polished as known in the art.

At this point, connector sub-assembly 16 assembly is completed. As illustrated in FIG. 8, the plug housing 12 is placed over the retention body 14 and connector sub-assembly 16 holding the ferrule 22. Connector sub-assembly 16 and ferrule 22 are accessible through one open end of the plug housing 12, such that the ferrule 22 can be optically connected to the ferrule of a complementary receptacle or other suitable connector assembly. The dust cap 38 (FIG. 1) can be placed over the shrouding fingers 122 to protect the ferrule 22 and the exposed end 39 of the plug housing 12.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention and are intended to be covered by the appended claims. It will also be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic connector assembly, comprising:
   a connector sub-assembly including a ferrule, a ferrule holder having a passage extending therethrough and a connector housing;
   a stiffener tube comprising a tube body disposed about a portion of at least one optical fiber;
   at least one opening disposed in the tube body adapted for venting gas contained inside the stiffener tube when inserted into the passage of the ferrule holder; and
   a retention body having a first portion configured to engage and retain one or more strength members of a fiber optic cable and a second portion configured to engage and retain the connector sub-assembly, wherein the retention body has one or more resilient fingers for attaching the connector sub-assembly thereto.

2. The fiber optic connector assembly of claim 1, wherein the tube body comprises a tube wall, wherein the at least one opening is disposed in the, tube wall along the length of the tube body.

3. The fiber optic connector assembly of claim 1, further comprising a bonding agent placed inside a portion of the passage of the ferrule holder for retaining the stiffener tube and the at least one optical fiber.

4. The fiber optic connector assembly of claim 3, wherein the bonding agent is comprised from the group consisting of an epoxy, a visible light curable epoxy, an ultraviolet light curable epoxy, and a heat curable epoxy.

5. The fiber optic connector assembly of claim 1, wherein the at least one opening disposed in the tube body is comprised of a plurality of openings disposed in the tube body, wherein at least one of the plurality of openings is located inside the ferrule holder passage, and wherein at least one of another of the plurality of the openings is located outside the ferrule holder passage, when the stiffener tube is inserted into the ferrule holder passage.

6. The fiber optic connector assembly of claim 1, wherein the at least one opening is comprised from the group consisting of an orifice, a hole, a slit, a cut, a ring cut, the tube body formed from a porous material, the tube body formed from a permeable material, and the tube body comprised of a mesh.

7. The fiber optic connector assembly of claim 1, wherein the stiffener tube is formed out of a material comprised from the group consisting of a thermoplastic material, a fluoropolymer, Tetrafluoroethylene (TFE), Polytetrafluorethylene (PTFE), Polyvinylidene Fluoride (PVDF), and a Teflon®-based material.

8. The fiber optic connector assembly of claim 1, further comprising a substantially hollow plug housing, wherein the retention body is disposed within the substantially hollow plug housing.

9. The fiber optic connector assembly of claim 1, wherein the connector housing of the connector sub-assembly is a SC connector housing.

* * * * *